United States Patent
Zhang

(10) Patent No.: US 8,194,338 B1
(45) Date of Patent: Jun. 5, 2012

(54) PARALLEL MEDIA DEFECT SCAN IN SECTOR READ

(75) Inventor: Baoliang Zhang, Foothill Ranch, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 125 days.

(21) Appl. No.: 12/751,947

(22) Filed: Mar. 31, 2010

(51) Int. Cl.
*G11B 27/36* (2006.01)

(52) U.S. Cl. .......................................... 360/31

(58) Field of Classification Search .................. None
See application file for complete search history.

(56) References Cited

U.S. PATENT DOCUMENTS

| | | | |
|---|---|---|---|
| 5,195,076 A | 3/1993 | Aoki | |
| 5,280,395 A | 1/1994 | Matsuzaki | |
| 6,104,556 A | 8/2000 | Schaenzer | |
| 6,292,912 B1 * | 9/2001 | Cloke et al. ................ | 714/718 |
| 6,292,913 B1 | 9/2001 | Son | |
| 6,366,081 B1 | 4/2002 | Tan et al. | |
| 6,504,662 B2 | 1/2003 | Sobey | |
| 6,606,211 B1 | 8/2003 | Lim et al. | |
| 6,731,442 B2 | 5/2004 | Jin et al. | |
| 6,947,232 B2 | 9/2005 | Lim et al. | |
| 7,072,129 B1 | 7/2006 | Cullen et al. | |
| 7,522,366 B2 | 4/2009 | Mettler et al. | |
| 7,525,307 B2 | 4/2009 | Shen | |
| 7,567,397 B2 | 7/2009 | Lu | |
| 7,656,763 B1 | 2/2010 | Jin et al. | |
| 8,014,094 B1 * | 9/2011 | Jin ................................. | 360/31 |
| 8,094,396 B1 | 1/2012 | Zhang et al. | |
| 2004/0153949 A1 | 8/2004 | Ro et al. | |
| 2005/0180282 A1 | 8/2005 | Ouyang et al. | |
| 2006/0066971 A1 | 3/2006 | Alex et al. | |
| 2007/0279788 A1 | 12/2007 | Andersen et al. | |
| 2008/0010509 A1 | 1/2008 | Southerland et al. | |
| 2008/0151435 A1 * | 6/2008 | Takahashi ..................... | 360/313 |
| 2008/0168315 A1 | 7/2008 | Mead et al. | |
| 2008/0189469 A1 | 8/2008 | Mettler et al. | |

* cited by examiner

*Primary Examiner* — Daniell L Negron
*Assistant Examiner* — Regina N Holder

(57) ABSTRACT

Systems and methods for performing a defect scan of a disk are provided. In one embodiment, a disk drive comprising a disk, a head configured to read an area of the disk to generate a read signal, and read channel circuitry configured to receive the read signal from the head, perform channel statistic measurements on the read signal, and to generate a Channel Statistic Metric (CSM) flag based on the channel statistic measurements. The disk drive further comprises defect scan circuitry configured to receive the CSM flag from the read channel circuitry, to accumulate the CSM flag to obtain an accumulated CSM flag value and to detect a defect area on the disk based on the accumulated CSM flag value.

19 Claims, 7 Drawing Sheets

PARALLEL MEDIA DEFECT SCAN IN SECTOR READ

BACKGROUND

A disk in a disk drive is coated with a magnetic material which is magnetized with a write head in order to record information onto the surface of the disk. Various influences may render portions of the disk surface unusable (i.e., defective), for example, if the magnetic coating is not evenly applied to the disk surface or if a particle contaminates the magnetic coating. During a manufacturing media defect scan procedure, the defective areas of the disk are located and mapped out so they are not used during normal operation. The defect scan typically involves writing a high frequency pattern (e.g., a 2T pattern) to the disk, and then reading the high frequency pattern while monitoring a quality metric, such as an amplitude of the read signal, a mean-squared-error of the read signal, a bit error of the read signal, a timing error of the read signal, or the output of defect scan filters having impulse responses matched to defect signatures. If the quality metric falls below a predetermined defect scan threshold, a defect is detected.

A media defect scan is typically a dedicated test process that takes a significant time to complete (e.g., hours for a single disk). If the defect scan is simply removed to reduce the test time of a drive, then many defect areas on the disk may not be found and mapped out. The drive may be unable to recover user data written to the defect areas, resulting in data loss.

Accordingly, there is a need to reduce the test time of a drive while providing improved detection of defect areas on the disk.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
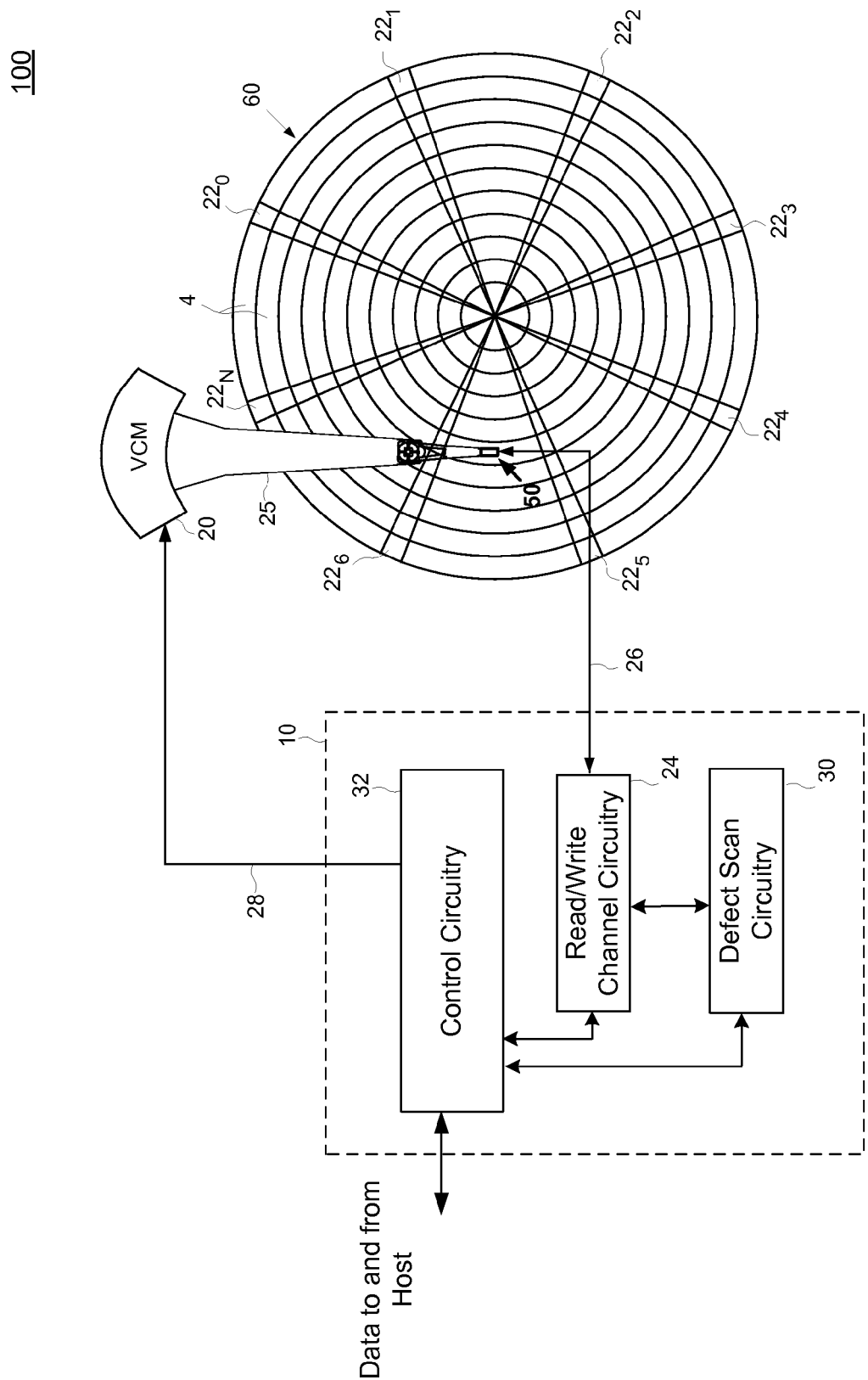
FIG. 1 is a block diagram of a disk drive according to an embodiment of the present invention.

FIG. 1 shows a disk drive 100 according to an embodiment of the present invention. The disk drive 100 comprises a rotating magnetic disk 60 and a head 50 connected to the distal end of an actuator arm 25. The actuator arm 25 is rotated about a pivot by a voice coil motor (VCM) 20 to position the head 50 radially over the disk 60. The disk 60 comprises a number of concentric data tracks 4, each of which may be partitioned into a number of data sectors (not shown). The disk 60 may also comprise a plurality of embedded servo sectors $22_0$-$22_N$, each of which may include position information that can be read from the disk 60 by the head 50 to determine the position of the head 50 over the disk 60.

The disk drive 100 also comprises a controller 10 that performs various operations of the disk drive 100 described herein. The controller 10 may be implemented using one or more processors for executing instructions and may further include memory, such as a volatile or non-volatile memory, for storing data (e.g., data being processed) and/or instructions. The instructions may be executed by the one or more processors to perform the various functions of the controller 10 described herein. The one or more processors may include a microcontroller, a Digital Signal Processor (DSP), an Application Specific Integrated Circuit (ASIC), a Field Programmable Gate Array (FPGA), hard-wired logic, analog circuitry and/or a combination thereof.

The controller 10 may further comprise control circuitry 32, read/write channel circuitry 24 and defect scan circuitry 30.

To write data to the disk 60, the control circuitry 32 may first position the head 50 at a desired data track 4 on the disk 60 by sending a control signal to the VCM 20. The control circuitry 32 may include a servo controller that adjusts the position of the head 50 using the VCM 20 based on position information read from the disk 60 to maintain the head 50 over the desired track 4. The control circuitry 32 then sends data (e.g., bits) to be written to the disk 60 to the read/write channel circuitry 24. The read/write channel circuitry 24 processes the data into a write signal, which is outputted to the head 50. The head 50 converts the write signal into a magnetic field that magnetizes the disk surface under the head 50 based on the write signal, thereby magnetically writing the data to the disk 60.

To read data from the disk 60, the control circuitry 32 positions the head 50 at a desired data track 4 on the disk 60. The head 50 generates a read signal based on the magnetization of the disk surface under the head 50. The read/write channel circuitry 24 processes the read signal into data (e.g., bits), which is outputted to the control circuitry 32. The read/write channel circuitry 24 may do this, for example, by performing channel statistic measurements on the read signal to determine bits from the read signal. For example, the read/write channel circuitry 24 may perform a Viterbi algorithm to determine a sequence of bits resulting in an expected read signal that matches the observed read signal (i.e., the received read signal). In another example, the read/write channel circuitry 24 may compute log likelihood ratios (LLR) based on the read signal and determine bits based on the LLR.

The read/write channel circuitry 24 may also generate channel statistic metric (CSM) values using the channel statistic measurements and make bit decisions from the read signal based on the CSM values. The CSM values may include, but are not limited to, log likelihood ratios (LLR) metric values and Viterbi margin metric (VMM) values. The CSM values may also indicate the likelihood that the corresponding bit decisions by the read/write channel circuitry 24 are correct, and the quality of the read signal. For example, a low CSM value may indicate a high confidence that the corresponding bit decision is correct and a strong read signal. A high CSM value, on the other hand, may indicate a low confidence that the bit decision is correct and a poor read signal. In one embodiment, the read/write channel circuitry 24 may generate a channel statistic metric (CSM) flag to indicate low confidence of a correct bit decision and a poor read signal. For example, the read/write channel circuitry 24 may generate the CSM flag when a CSM value exceeds a threshold.

One approach to detect a defective sector on the disk 60 is to perform a sector mode read. In this approach, random data may be written to the sector. The data is then read back from the sector and a number of errors in the read data is determined. The errors may be detected by comparing the read data with the data originally written to the sector. The sector may be declared defective if the number of errors (e.g., symbols, byte or bit errors) exceeds a certain threshold. The threshold may be based on the number of errors that the drive is capable of correcting using error correction code (ECC).

However, this approach may not detect a weak sector, in which the magnetization of bits stored in the sector is weak. This is because the read/write channel 24 may still manage to make correct bit decisions even though the read signal from the weak sector is poor. As a result, the weak sector may go undetected using the sector read.

Even though the read/write channel 24 may be able to recover data from a weak sector during the sector read, the read/write channel 24 may be unable to recover the data at a later time. This is because the data stored in the weak sector may become corrupted or degraded after the sector read. For example, when data is written to adjacent tracks, magnetic flux lines from the adjacent track writes may flip magnetically weak bits in the weak sector. As a result, the read/write channel 24 may no longer be able to recover the original data from the weak sector, resulting in data loss.

Defect scans that may be performed by the detect scan circuitry 30 according to various embodiments of the present invention will now be described. The defect scans may be performed in parallel with sector reads and/or other read operations to provide improved detection of defect areas (e.g., weak sectors) on the disk 60. Because the defect scans are performed in parallel with read operations, they may be performed without increasing the test time of the drive. Although the defect scan circuitry 30 is shown separately from the read/write channel circuitry 24 for ease of illustration, it is to be understood that the defect scan circuitry 30 may share components with the read/write channel circuitry 24.

Figure 2:
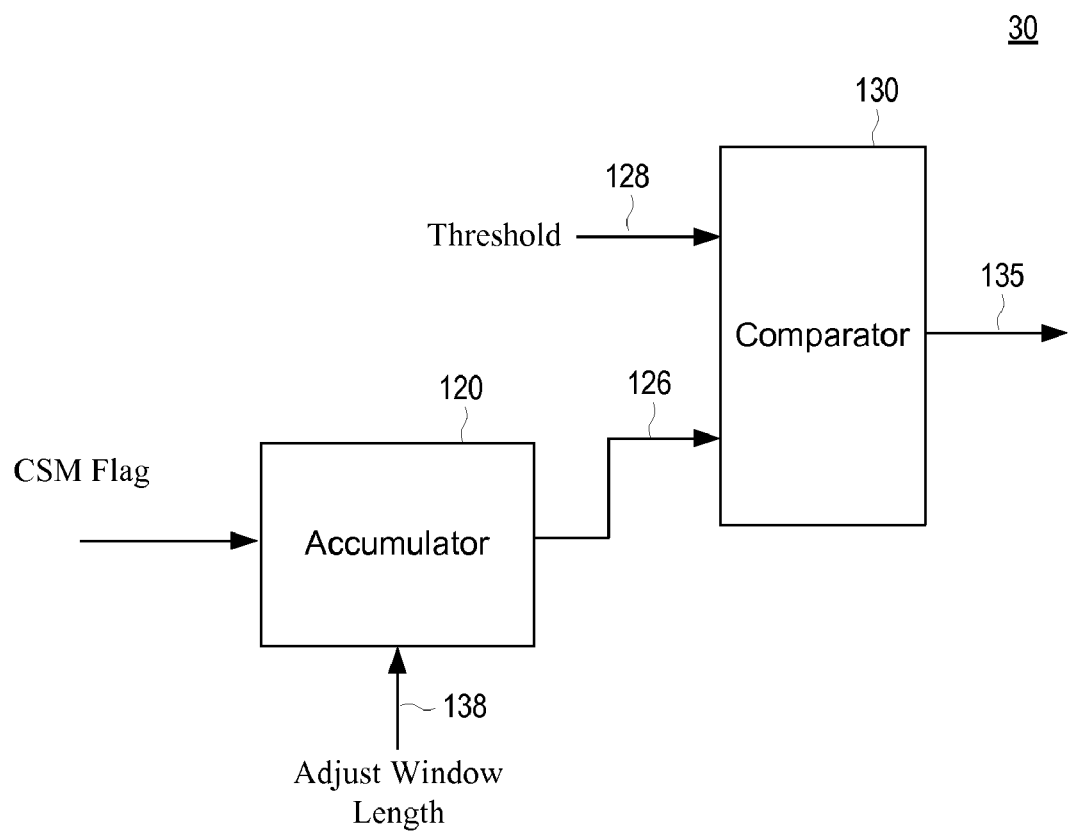
FIG. 2 is a block diagram of defect scan circuitry according to an embodiment of the present invention.

FIG. 2 shows the defect scan circuitry 30 according to an embodiment of the present invention. The defect scan circuitry 30 comprises an accumulator 120 and a comparator 130. In one embodiment, the accumulator 120 is configured to receive the CSM flag from the read/write channel circuitry 24 during a read operation (e.g., sector read) and accumulate the CSM flag over a window to obtain an accumulated CSM flag value 126. The accumulated CSM flag value 126 may indicate the number of times that the CSM flag is outputted from the read/write channel circuitry 24 over the window. As discussed above, the read/write channel circuitry 24 may output the CSM flag value when a CSM value exceeds a threshold.

The comparator 130 receives the accumulated CSM flag value 126 from the accumulator 120 and a threshold 128, not to be confused with the threshold used to generate the CSM flag. In one embodiment, the comparator 130 compares the accumulated CSM flag value 126 with the threshold 128, and outputs a defect flag 135 to the control circuitry 32 when the accumulated CSM flag value 126 is equal to or exceeds the threshold 128. Upon receiving the defect flag 135, the control circuitry 32 may declare the corresponding sector defective and map out the sector from normal write operations. In another embodiment, the control circuitry 32 may mark the corresponding sector in a log as being potentially defective and later verify whether the sector is defective. For example, the control circuitry 32 may perform another sector read of the sector after writing data to adjacent tracks to determine whether data in the sector is corrupted by adjacent track interference. If the data is determined to be corrupted (e.g., the control circuitry 32 is unable to recover the data), then the control circuitry 32 may declare the sector defective.

Thus, the defect scan circuitry 30 according to this embodiment outputs a defect flag 135 for a sector of the disk 60 when the accumulated CSM flag value 126 exceeds the threshold 128. This may occur, for example, when the sector is weak. This is because a weak sector may have numerous magnetically weak bits, causing the read/write channel circuitry 24 to output the CSM flag more frequently and, therefore, the accumulated CSM flag value 126 to equal or exceed the threshold 128. As a result, the defect scan circuitry 30 is able to detect a weak sector that may go undetected by a sector read.

Further, the defect scan circuitry 30 may perform the defect scan in parallel with a sector read by the read/write channel circuitry 24. This is because the read/write channel circuitry 24 generates the CSM flag based on channel statistic measurements already used to make bit decisions during a sector read. Thus, the defect scan circuitry 30 is able to provide improved detection of defective sectors (e.g., weak sectors) without increasing the test time of the drive.

In one embodiment, the window of the accumulator 120 may be a moving window having a length of N bytes (e.g., 16 to 256 bytes) that moves across a sector during a sector read. Thus, in this embodiment, the accumulated CSM flag value 126 at a given time instance may represent the CSM flag accumulated over the last N bytes in the sector that have been read from that time instance. In this embodiment, before N bytes in the sector have been read during the sector read, the length of the window may be equal to the number of bytes that have been read.

In one embodiment, the accumulator 120 may include an input 138 for adjusting the length of the window. In this embodiment, the control circuitry 32 may input a control signal to the accumulator 120 to adjust the window length. In this embodiment, the control circuitry 32 may adjust the window length and/or threshold 128 based a number of factors, such as, desired defect scan sensitivity, the ability of the control circuitry to correct bit errors, the quality of the magnetic material used for the disk 60, and/or other factors. A window length and/or threshold for a particular application may be determined experimentally, for example, by testing the ability of the defect scan circuitry 30 to detect known defect areas for various window lengths and/or thresholds.

When the defect scan circuitry 30 outputs a defect flag during a sector read, the control circuitry 32 may stop the current sector read and mark the corresponding sector as defective. In this case, the control circuitry 32 may map out the sector by including the sector in a permanent defect list so that the sector is not used during a normal write operation.

In another embodiment, when the defect scan circuitry 30 outputs a defect flag during a sector read, the control circuitry 32 may mark the sector in a log as being potentially defective and continue the sector read. In this case, the control circuitry 32 may later verify whether the sector marked as potentially defective is defective. The control circuitry 30 may do this, for example, by performing multiple sector reads for the sector after adjacent track writes.

Figure 3:
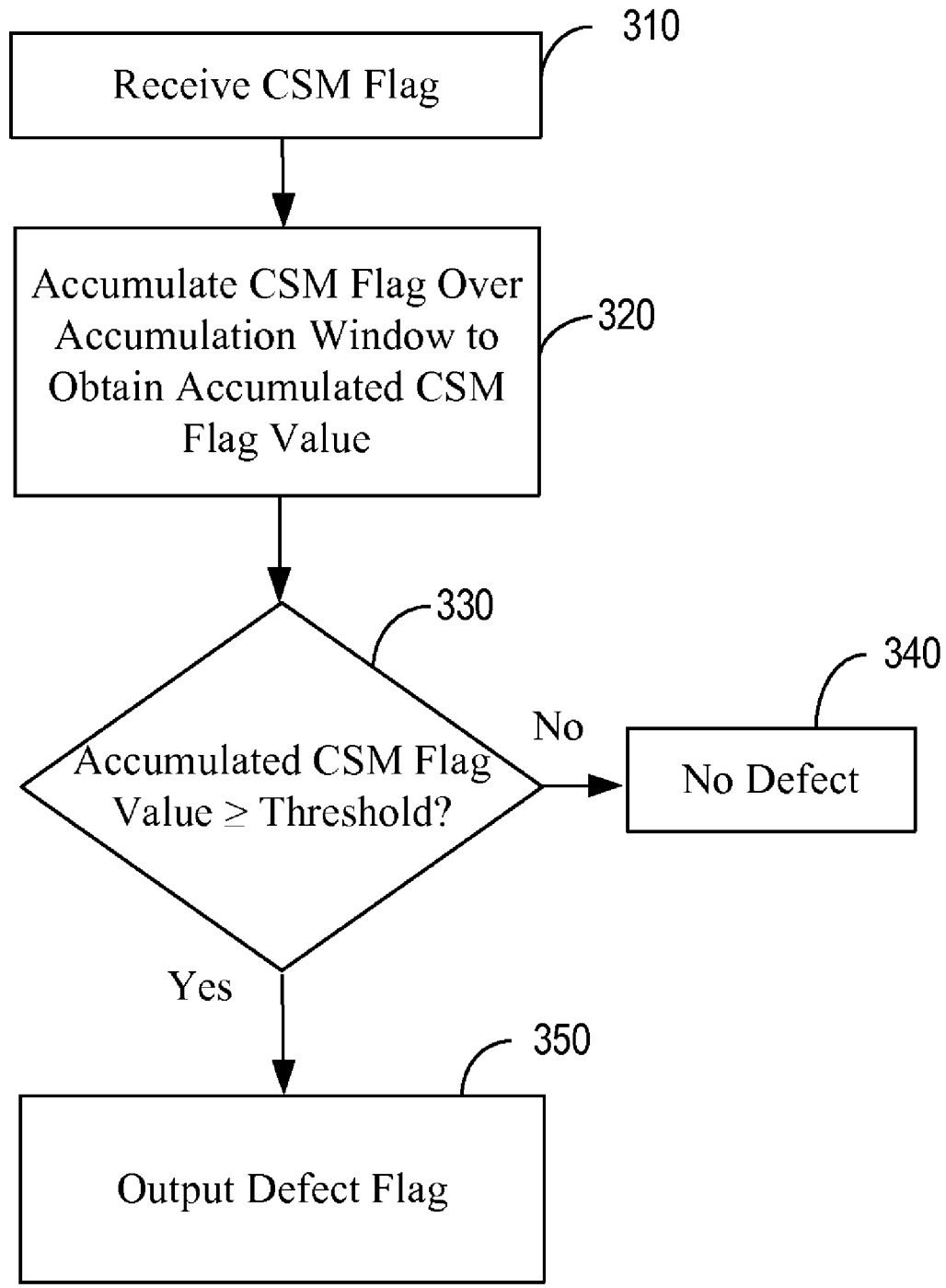
FIG. 3 is a flowchart of a method for defect scanning according to an embodiment of the present invention.

FIG. 3 is a flowchart of a method for performing a defect scan of an area (e.g., sector) of the disk 60 according to an embodiment of the present invention. The method may be performed by the defect scan circuitry 30.

In step 310, the accumulator 120 receives the CSM flag from the read/write channel circuitry 24. In step 320, the accumulator 120 accumulates the CSM flag over a window to obtain an accumulated CSM flag value 126. As discussed above, the window may be a moving window covering the last N bytes that have been read in a sector during a sector read. In step 330, the comparator 130 compares the accumulated CSM flag value 126 with the threshold 128 to determine whether the accumulated CSM flag value 126 is equal to or exceeds the threshold 128. If the accumulated CSM flag value 126 is below the threshold 128, then there is no defect in step 340. If the accumulated CSM flag value is equal to or exceeds the threshold 128, then a defect flag 135 is outputted to the control circuitry 32 in step 350. Steps 310-350 may be repeated for each bit or byte read by the read/write channel circuitry 24.

Figure 4:
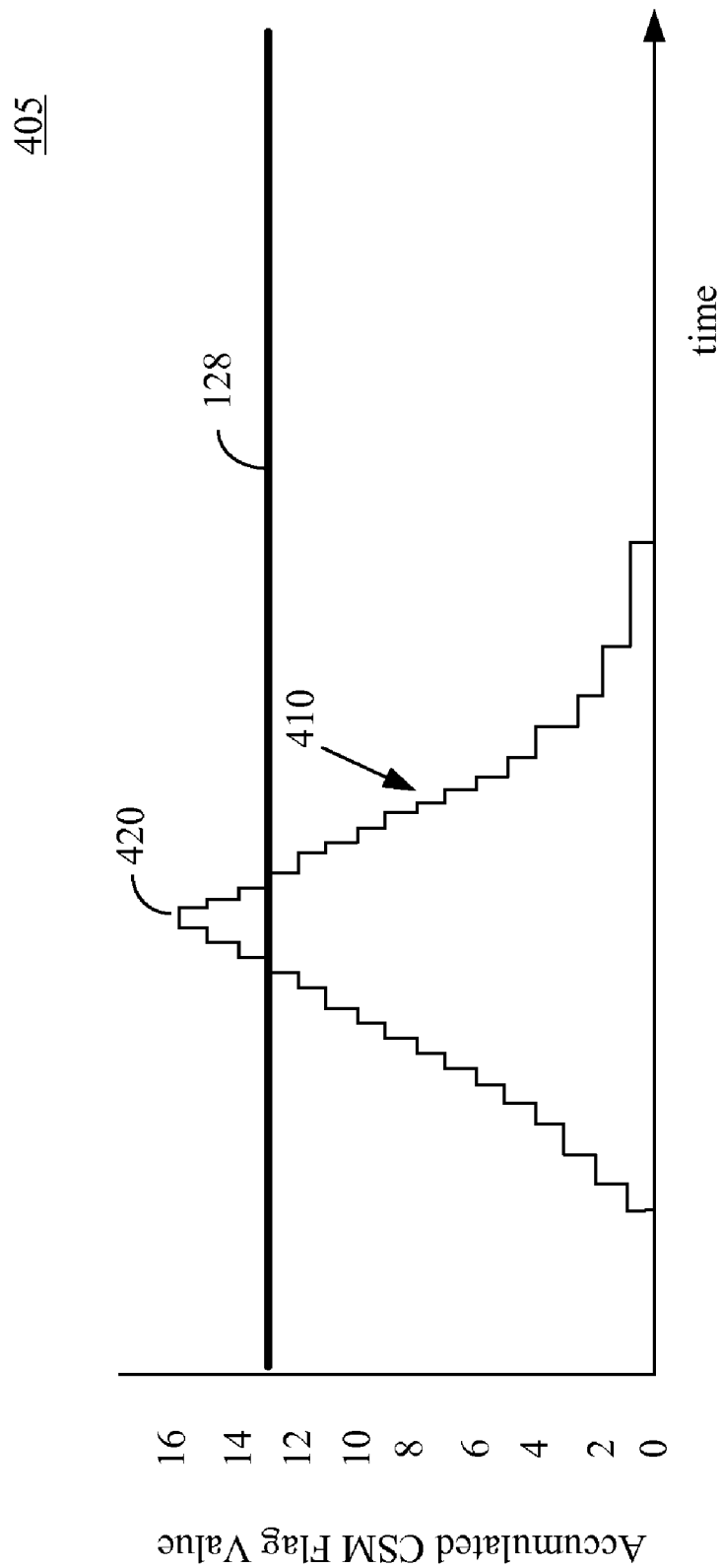
FIG. 4 is an example of a plot of an accumulated CSM flag value over time for a sector read.

FIG. 4 shows an example of a plot 405 of the accumulated CSM flag value over time during a sector read. In the plot 405, the accumulated CSM flag value 410 is plotted on the vertical axis and time is plotted on the horizontal axis.

In this example, the accumulator 120 accumulates the CSM flag from the read/write channel circuitry 24 over a moving window of N bytes (e.g., 16 to 256 bytes). Thus, at each time instance in the plot 405, the accumulated CSM flag value 410 represents the CSM flag accumulated over the last N bytes in the sector that have been read from that time instance. In the example in FIG. 4, the peak 420 of the accumulated CSM value 410 during the sector read exceeds the threshold 128, causing the scan defect circuitry 30 to output a defect flag to the control circuitry 32.

Figure 5:
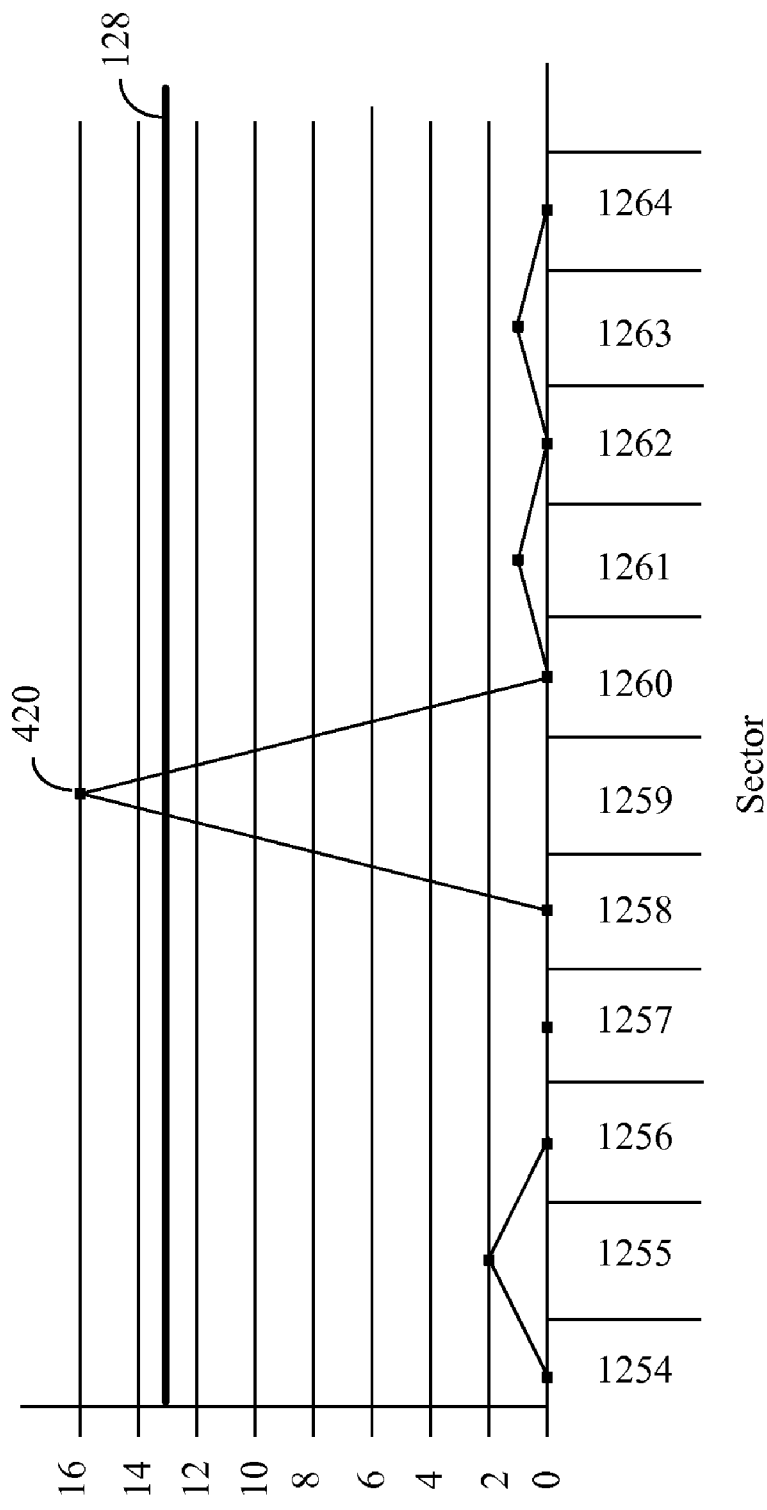
FIG. 5 is an example of a plot showing the peak accumulated CSM flag values for different sectors.

FIG. 5 shows an example of a plot 505 of the peak accumulated CSM flag values for different sectors. In this example, the sectors are numbered 1254 to 1264. The peak accumulated CSM flag value for each sector represents the peak of the accumulated CSM flag value during the sector read for that sector.

In the example in FIG. 5, the peak accumulated CSM flag value 420 for sector 1259 exceeds the threshold 128, in which case the defect scan circuitry 30 outputs a defect flag to the control circuitry 32 for sector 1259. The plot in FIG. 4 may represent the accumulated CSM flag value over time for sector 1259 during the sector read with the peak accumulated CSM flag value 420 in FIG. 4 corresponding to the peak accumulated CSM flag value in FIG. 5.

In the example in FIG. 5, the peak accumulated CSM flag values for the other sectors 1254 to 1258 and 1260 to 1264 are below the threshold 128. Therefore, the defect scan circuitry 30 does not output a defect flag for the other sectors 1254 to 1258 and 1260 to 1264.

Figure 6:
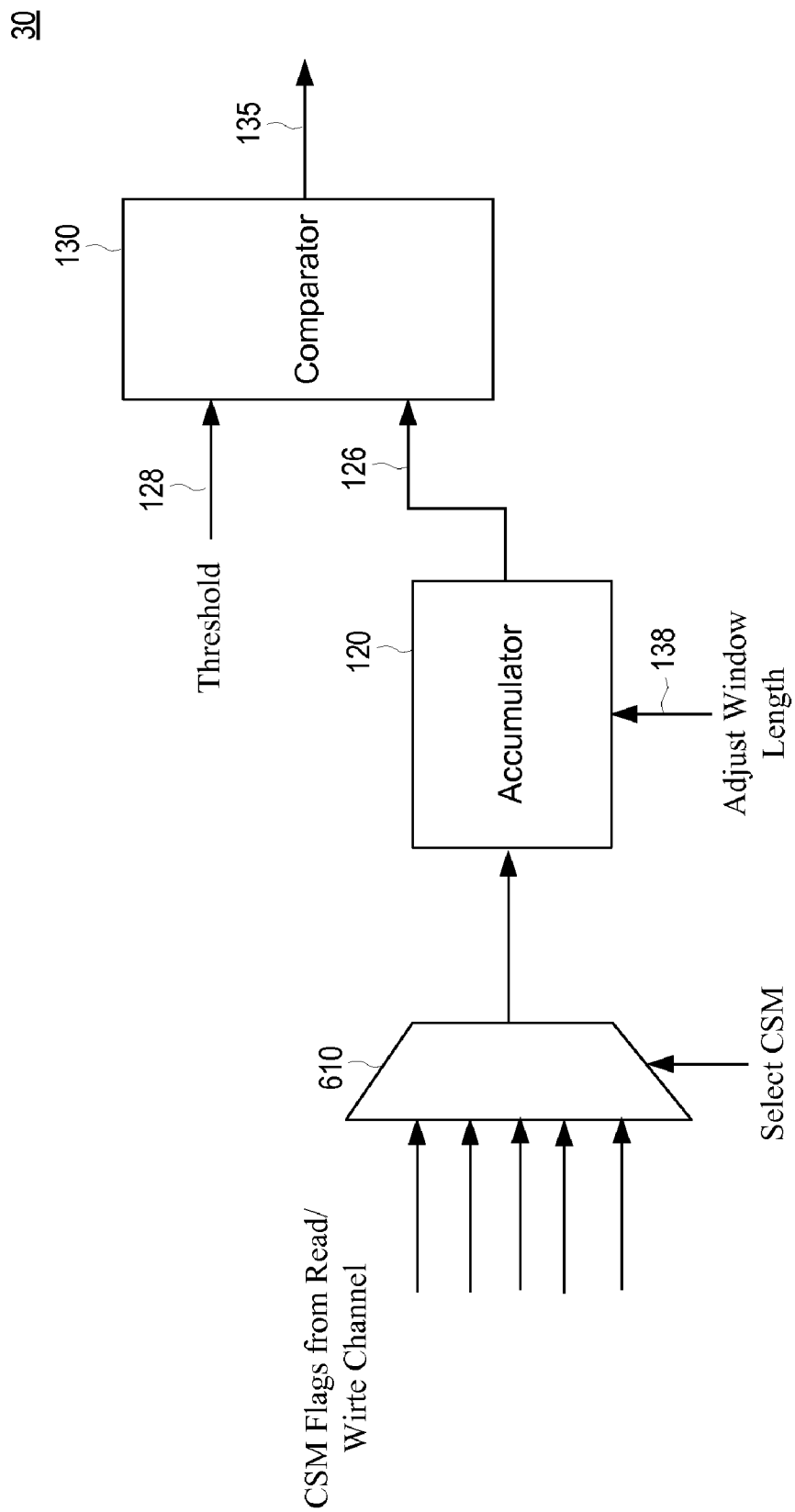
FIG. 6 is a block diagram of defect scan circuitry according to another embodiment of the present invention.

FIG. 6 shows the defect scan circuitry 30 according to another embodiment of the present invention. In this embodiment, the defect scan circuitry 30 includes a CSM selector 610 that receives a plurality of CSM flags from the read/write channel circuitry 24, selects one of the CSM flags, and outputs the selected CSM flag to the accumulator 120. Each CSM flag may be based on a different type of channel statistic measurement. For example, one CSM flag may be a log likelihood ratios (LLR) metric flag, and another CSM flag may be a Viterbi margin metric (VMM) flag. In this embodiment, the CSM selector 610 may include a selector input 615, and the control circuitry 24 may input a control signal to the CSM selector 160 to select which CSM flag is accumulated by the accumulator 120. For example, one type of CSM flag may be better at detecting defect areas or sectors than another type of CSM flag for a particular application. In this example, the control circuitry 30 may select the CSM flag best suited for the particular application.

Figure 7:
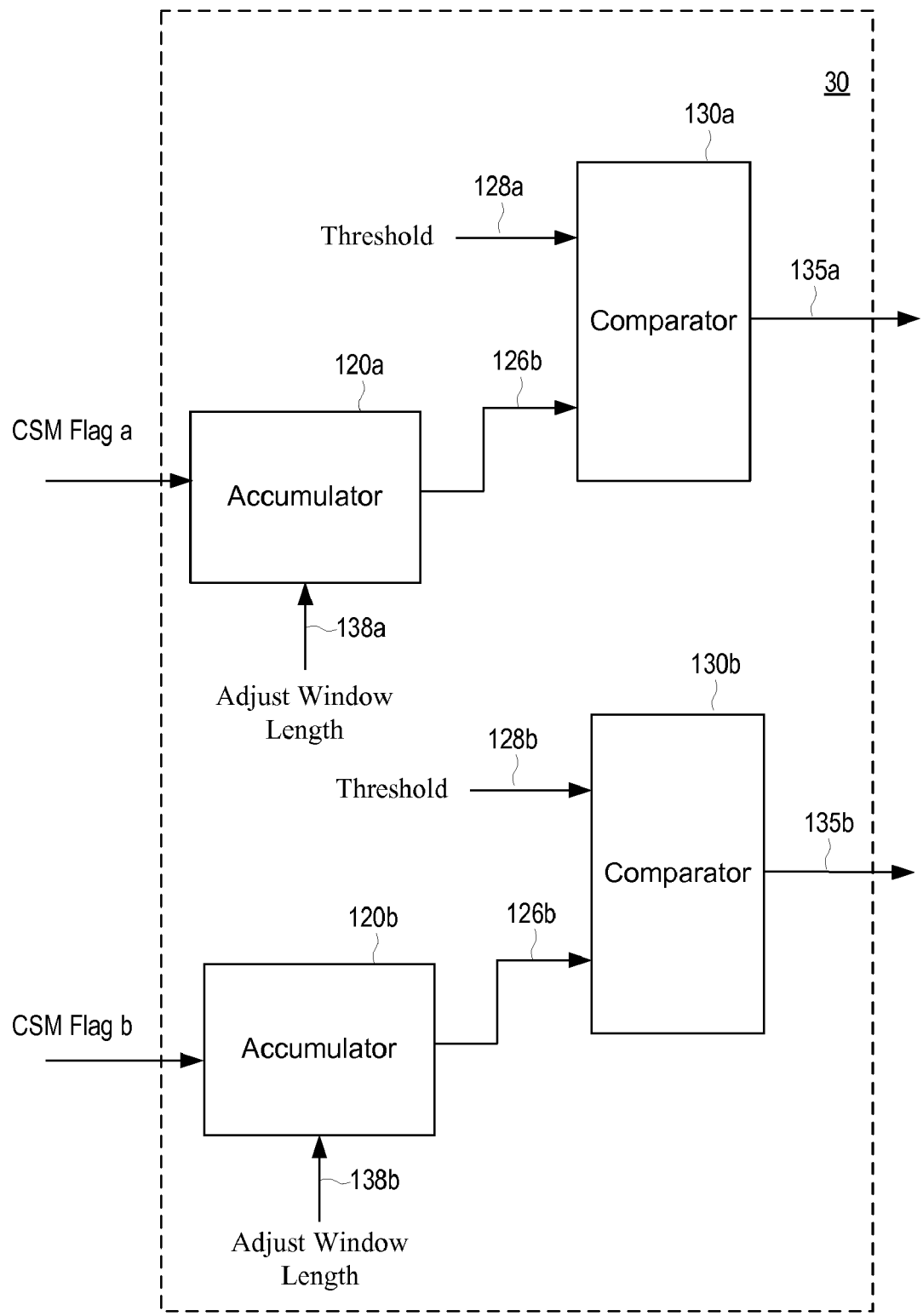
FIG. 7 is a block diagram of defect scan circuitry according to yet another embodiment of the present invention.

FIG. 7 shows the defect scan circuitry 30 according to yet another embodiment of the present invention. In this embodiment, the defect scan circuitry 30 includes two accumulators 120a and 120b and two corresponding comparators 130a and 130b. In this embodiment, each accumulator 120a and 120b accumulates a different type of CSM flag and outputs the resulting accumulated CSM flag value 126a and 126b to the respective comparator 130a and 130b. For example, accumulator 120a may accumulate a log likelihood ratios (LLR) metric flag, and the other accumulator 120b may accumulate a Viterbi margin metric (VMM) flag. Each comparator 120 compares the accumulated CSM flag value 126a and 126b from the respective accumulator 120a and 120b with the respective threshold 128a and 128b, and outputs a defect flag when the accumulated CSM flag value 126a and 126b is equal to or exceeds the respective threshold 128a and 128b.

In this embodiment, the control circuitry 32 may declare an area or sector defective when the control circuitry 30 outputs a defect flag from one or both of the comparators 130a and 130b. This allows the defect scan circuitry 30 to detect a defect area or sector using different types of CSM flags simultaneously. In this embodiment, the control circuitry 30 may independently control the thresholds 128a and 128b and window lengths 138a and 138b for the different types of CSM flags.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A disk drive comprising:
    a disk;
    a head configured to read an area of the disk to generate a read signal;
    read channel circuitry configured to receive the read signal from the head, perform channel statistic measurements on the read signal, and to generate a Channel Statistic Metric (CSM) flag based on the channel statistic measurements, the CSM flag being one of a Log Likelihood Ratio (LLR) metric flag and a Viterbi Margin Metric (VMM) flag; and
    defect scan circuitry configured to receive the CSM flag from the read channel circuitry, to accumulate the CSM flag to obtain an accumulated CSM flag value and to detect a defect area on the disk based on the accumulated CSM flag value.

2. The disk drive of claim 1, wherein the read circuitry is configured to generate the CSM flag by comparing a CSM value based on the channel statistic measurements with a first threshold and outputting the CSM flag to the defect scan circuitry based on the comparison.

3. The disk drive of claim 1, further comprising control circuitry configured to map out the detected defect area on the disk from write operations.

4. The disk drive of claim 1, wherein the read circuitry is configured to decode the read signal into binary read data based on the channel statistic measurements.

5. The disk drive of claim 4, wherein the control circuitry is further configured to compare the read data from the read circuitry with write data that was written to the disk and to determine a number of errors in the read data based on the comparison.

6. The disk drive of claim 1, wherein the defect area corresponds to a sector of the disk.

7. A method for performing a defect scan of a disk, comprising:
    reading an area of the disk with a head to generate a read signal;
    performing channel statistic measurements on the read signal;
    generating a Channel Statistic Metric (CSM) flag based on the channel statistic measurements, the CSM flag being one of a Log Likelihood Ratio (LLR) metric flag and a Viterbi Margin Metric (VMM) flag;
    accumulating the CSM flag to obtain an accumulated CSM; and
    detecting a defect area on the disk based on the CSM flags.

8. The method of claim 7, wherein generating the CSM flag comprises:
    comparing a CSM value based on the channel statistic measurements with a first threshold; and
    outputting the CSM flag based on the comparison.

9. The method of claim 7, wherein detecting the defect area on the disk comprises:
    comparing the accumulated CSM flag value with a second threshold; and
    outputting a defect signal based on the comparison.

10. The method of claim 9 further comprising mapping out an area on the disk corresponding to the defect signal from write operations.

11. The method of claim 7, further comprising mapping out the detected defect area on the disk from write operations.

12. The method of claim 7, further comprising decoding the read signal into binary read data using the channel statistic measurements.

13. The method of claim 12, further comprising:
    comparing the read data with write data that was written to the disk; and
    determining a number of errors in the read data based on the comparison.

14. The method of claim 7, wherein the defect area corresponds to a sector of the disk.

15. A disk drive comprising:
    a disk;
    a head configured to read an area of the disk to generate a read signal;
    read channel circuitry configured to receive the read signal from the head, perform channel statistic measurements on the read signal, and to generate a Channel Statistic Metric (CSM) flag by comparing a CSM value based on the channel statistic measurements with a first threshold and outputting the CSM flag to the defect scan circuitry based on the comparison; and
    defect scan circuitry configured to receive the CSM flag from the read channel circuitry, the defect scan circuitry including:
        an accumulator configured to accumulate the CSM flag over a moving accumulation window to produce the accumulated CSM flag value; and
        a comparator configured to compare the accumulated CSM flag value with a second threshold and to output a defect signal on the disk based on the comparison.

16. The disk drive of claim 15, wherein the accumulator is configured to receive an accumulator control signal and to adjust a length of the moving accumulation window based on the accumulator control signal.

17. The disk drive of claim 15, wherein the defect scan circuitry further comprises a CSM selector configured to receive different types of CSM flags from the read channel circuitry and to selectively output one of the different types of CSM flags to the accumulator.

18. The disk drive of claim 15, further comprising control circuitry configured to receive the defect signal from the defect scan circuitry and to map out an area on the disk corresponding to the defect signal from write operations.

19. The disk drive of claim 15, further comprising control circuitry configured to receive the defect signal from the defect scan circuitry and to verify that an area on the disk corresponding to the defect signal is defective.

* * * * *